United States Patent Office 2,721,167
Patented Oct. 18, 1955

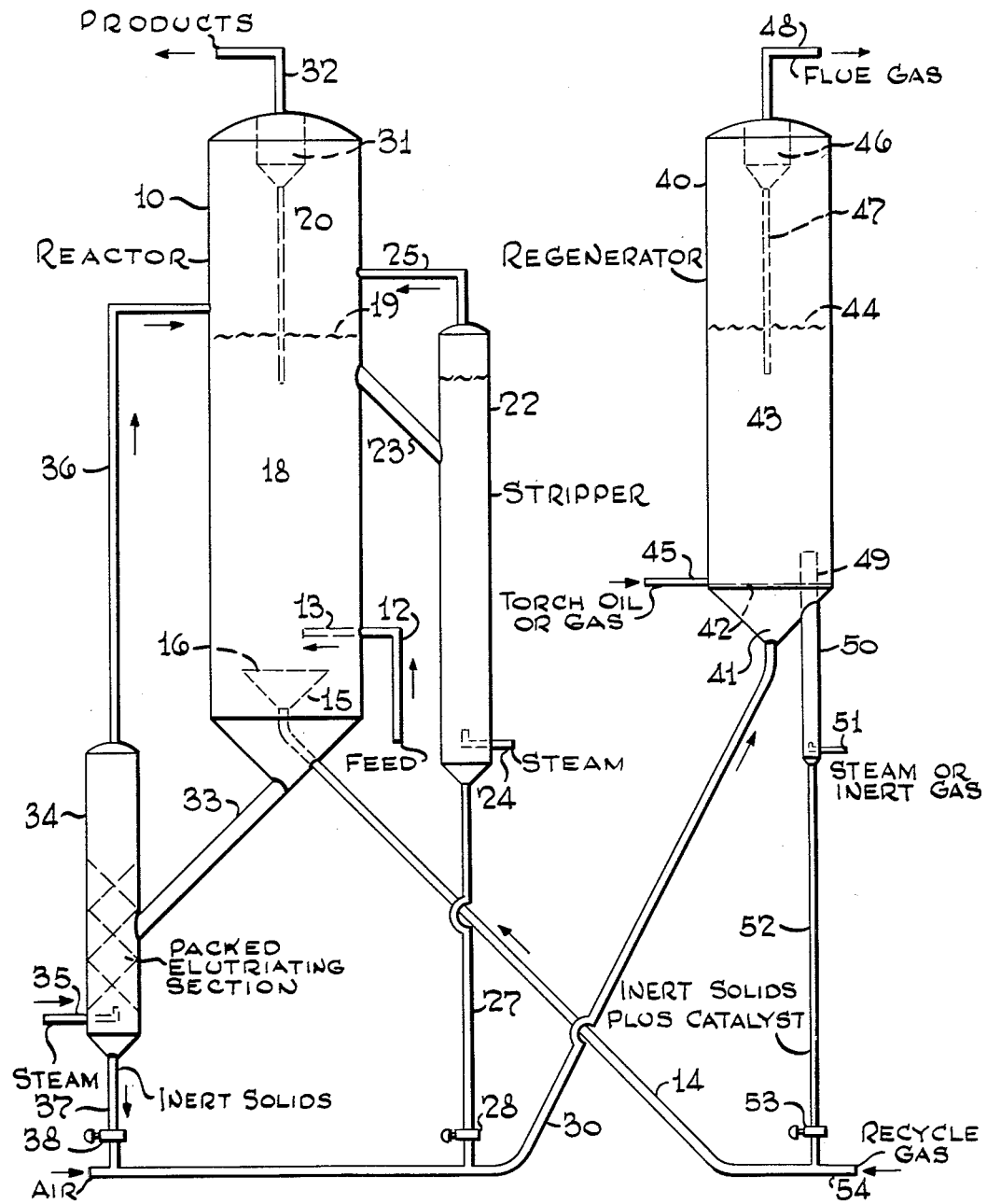

2,721,167

CATALYTIC FLUID HYDROFORMING EMPLOYING INERT HEAT TRANSFER SOLIDS

Edward W. S. Nicholson, Baton Rouge, La., assignor to Esso Research and Engineering Company, a corporation of Delaware Application April 4, 1951, Serial No. 219,217

4 Claims. (Cl. 196—50)

This invention pertains to the catalytic conversion of hydrocarbon fractions and particularly to the conversion of hydrocarbon fractions boiling within the motor fuel boiling range of low knock rating into high octane number motor fuels. Specifically this invention pertains to an improved process for upgrading hydrocarbon fractions boiling within the motor fuel or naphtha range by hydroforming or aromatizing the same in a fluidized solids reactor system.

Hydroforming is a well known and widely used process for treating hydrocarbon fractions boiling within the motor fuel or naphtha range to upgrade the same or increase the aromaticity and improve the anti-knock characteristics of said fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen at temperatures of 750–1150° F. in the pressure range of about 50–3000 lbs. per sq. inch and in contact with such catalysts as molybdenum oxide or chromium oxide, or, in general, oxides and sulfides of metals of groups IV, V, VI, VII, and VIII of the periodic system of elements, alone, or generally supported on a base or spacing agent such as alumina gel, precipitated alumina or zinc aluminate spinel. Aromatization is carried out in the presence or absence of hydrogen in the presence of the same general class of catalysts at temperatures of about 750–1150° F. but at pressures of from atmospheric to at most about 100 lbs. per sq. inch.

It has been proposed in application Serial No. 188,236 filed October 3, 1950, now U. S. Patent No. 2,689,823, to effect the hydroforming of naphtha fractions in a fluidized solids reactor system in which naphtha vapors are passed continuously through a dense, fluidized bed of hydroforming catalyst particles in a reaction zone, spent catalyst being continuously withdrawn from the dense bed and passed to a separate regeneration zone where inactivating carbonaceous deposits are removed whereupon the regenerated catalyst particles are returned to the main reactor vessel. In the process disclosed in said application operation has been limited to low catalyst to oil ratios (around 1:1) by selectivity considerations since higher ratios resulted in excessive carbon formation. Moreover, high regeneration temperatures have not been possible due to steam deactivation of the catalyst. These factors limit the transfer of heat from the regenerator to the reactor via the catalyst and make it necessary to provide cooling coils in the regenerator and to provide furnaces or other means for supplying heat to the reactor either directly or indirectly through preheating the reactants and/or the hydrogen-rich recycle gas.

It is the object of this invention to provide a process whereby hydrocarbon fractions boiling within the motor fuel range may be hydroformed or aromatized in an advantageous manner by the fluidized solids technique.

It is a further object of this invention to provide a process whereby hydrocarbon fractions boiling within the motor fuel range may be hydroformed or aromatized in a fluidized solids reactor system in which all the heat released in the regeneration of the catalyst particles may be readily transferred from the regeneration vessel to the reaction vessel.

It is also an object of this invention to provide a process whereby hydrocarbon fractions boiling within the motor fuel range may be hydroformed or aromatized by the fluidized solids technique with low catalyst to oil ratios but at high temperatures and without excessive preheating of the naphtha feed and without the circulation of excessive amounts of recycle gas and without heating the recycle gas to excessively high temperatures.

It is a further object of this invention to devise a simple and economical method for transferring the heat of regeneration to the reactor vessel and simultaneously protecting the catalyst from excessively high or inactivating temperatures.

These and other objects will appear more clear from the detailed specification and claims which follow:

It has now been found that the hydroforming or aromatization of petroleum fractions boiling within the motor fuel boiling range in a fluidized solids reactor system can be carried out to greater advantage if extraneous heat-carrying or heat transfer solids are circulated between the reactor vessel and the regeneration vessel in a particular manner. It is, of course, old to use so-called pebble heaters to heat up an extraneous heat-carrying solid for circulation through a reaction zone in order to convey some or all of the heat required for carrying out the desired reaction or operation into the reaction zone. In accordance with the present invention a circulating stream of inert fluidized solids is provided to carry the necessary heat from the regenerator to the reactor, thus making it possible to operate with as low a circulation rate of catalyst as desired, thus reducing carbon formation and also oxygen as well as hydrogen requirements. The relative rates of circulation of catalyst and inert heat transfer solids are controlled by separate slide valves on individual standpipes through which the two solids streams are withdrawn from the reactor. The stream of inert solids is discharged from the reactor into the stream of regeneration air for transport to the regenerator upstream of the point of addition of the spent catalyst so that the heat absorptive capacity of the inert solids will preclude overheating the catalyst through combustion of the carbonaceous deposits thereon during its travel through the transfer line into the regenerator vessel. Extraneous heat may be added, if desired, to the circulating solids stream by introducing a combustible oil or gas directly into the regenerator. The mixture of inert heat transfer solids with the relatively small amount of catalyst is discharged from the regenerator via a standpipe, or the like into a stream of recycle gas which carries the mixture back to the reactor. Because of the great flexibility possible in the amount of heat provided by the circulating inert solids, it is not necessary to preheat the feed to temperatures that might result in thermal degradation of the feed. In fact, it is possible to eliminate entirely the feed preheat furnace and to heat the feed stream only to the temperatures possible by heat exchange with product streams. Further, it is not necessary to circulate such large volumes of recycle gas and it is not necessary to heat the recycle gas to the high temperatures of about 1200° F. that are normally required. This eliminates or minimizes the possibility of coking in the recycle gas fired coil. Moreover, it is possible with this arrangement to operate with recycle gas temperatures of 1000° F. or less, which permits using carbon steel furnace tubes in place of the more expensive alloy tubes required for the high recycle gas temperatures previously necessary.

Reference is made to the accompanying drawing illustrating a diagrammatic flow plan of the process in accordance with the present invention.

In the drawing, 10 is the reactor vessel and 40 is the regenerator vessel in the fluidized solids reactor system. Fresh feed or charging stocks, which may be a virgin naphtha, cracked naphtha, Fischer-Tropsch naphtha or the like having a boiling range of from about 130–430° F., is supplied under pressure and preheated to a desired temperature through line 12 to suitable distributor nozzles 13 in the lower portion of the reactor vessel 10. Catalyst and inert heat transfer solids are supplied to the reactor vessel 10 in finely divided condition in suspension in a hydrogen-containing gas, preferably recycle hydrogen-rich process gas through inlet line 14 which discharges into inlet cone 15 in the lower portion of the reactor vessel. Solid particles and carrying gas are discharged from the inlet cone through a perforated plate or grid 16 which serves to distribute the incoming material uniformly over the entire cross section of the reactor vessel.

Suitable catalysts include group VI metal oxides such as molybdenum oxide, chromium oxide or tungsten oxide or mixtures thereof preferably upon a carrier such as "activated alumina," zinc aluminate spinel or the like. The catalyst particles should, for proper fluidization, be between 200 and 400 mesh in size or about 0–200 microns in diameter with a major proportion between 20 and 80 microns.

The inert, heat transfer solids are preferably coarser and/or of greater density than the catalyst used in the process. Typical solids which may be used are metal spheres or ceramic balls or granules such as corundum or gamma alumina, fused silica or the like. It is necessary that these materials have no adverse effects upon the catalytic reactions occurring in the reactor and that they be stable or resistant to breakdown due to the temperature and mechanical action to which they are subjected. Unless the inert heat transfer solids are relatively heavy or have a bulk density at least 1.5 times the bulk density of the catalyst, they should be no smaller than about 100 microns and should preferably be in the range of 125–300 microns.

The feed or charging stock vapors introduced via nozzles 13 and the hydrogen-containing gas supplied through inlet chamber 15 and distributor grid 16 pass through the reaction zone at a superficial velocity of about 0.2 to 0.9 ft. per second at reactor conditions depending upon the pressure. For example, the velocity should be below 0.6 ft per second in the pressure range of 200–250 lbs. per sq. inch gauge. The velocity should be sufficient to maintain a dense turbulent, liquid simulating bed 18 of catalyst and inert solid particles and gas having a definite level 19 with a dilute phase suspension of solids and product vapors 20 thereabove.

A vertical conduit 22 is arranged alongside the reactor vessel 10 for receiving catalyst directly from the dense, fluidized bed 18 through connector pipe 23. An inlet 24 for the introduction of steam or other stripping gas is provided in the lower part of conduit 22 in order to displace, strip off or desorb hydrogen and/or hydrocarbons accompanying the catalyst particles withdrawn from the dense bed 18. The line 25 connecting the top of conduit 22 with the upper part of reactor 10 serves to conduct stripping gas and stripped vapors into the dilute phase in the reactor for admixture with product vapors. While the conduit or stripper 22 is shown arranged externally of the reactor vessel, it will be understood that it could also be arranged within the vessel itself in which event the conduit would be open at the top and extend into the dilute phase 20 and one or more restriction orifices would be provided in the wall of the conduit below the dense bed level 19 to permit passage of catalyst from the dense bed into the conduit 22.

Since the catalyst and hydrocarbon feed are introduced near the bottom of reactor 10 and product vapors are removed overhead and catalyst is removed near the top of the dense catalyst bed, there is a general concurrent flow of hydrocarbon vapors and catalyst in the reactor vessel 10. It is desirable to arrange the connector 23 in the upper portion of the bed to obtain maximum concurrent flow of catalyst and oil vapors up through the bed 18 and to obtain a minimum of short-circuiting or passage of catalyst into connector 23 and conduit 22 immediately after it enters the dense bed 18. The connector 23 should be sufficiently below the maximum bed level 19 to take care of any normal fluctuations in the depth of the dense bed. More than one connector 23 may be provided at different levels and each connector may be provided with means to control the flow of catalyst into conduit 22. The lower end of conduit 22 is necked down and connects to conduit 27 to form therewith a standpipe for developing a fluistatic pressure sufficient to cause the catalyst to flow through a control or slide valve 28 into transfer line 30 and thence into the regenerator 40.

The vaporous reaction products discharged overhead from the dense bed as well as the stripping gases discharged from the conduit 22 pass through a cyclone separator 31 or the like which serves to remove small amounts of catalyst that are entrained in the gaseous products. The separated catalyst particles are returned to the dense bed by the dip pipe shown and the vaporous products substantially free of catalyst are taken overhead through outlet line 32 and passed to suitable recovery or processing equipment.

The inert, heat transfer solid particles are withdrawn from the bottom of the reactor vessel through a passageway surrounding the inlet chamber 15 and pass in admixture with finely divided catalyst particles through line 33 into chamber 34. Suitable non-fluidizable packing such as Raschig rings, Berl saddles or the like is arranged in the lower part of chamber 34 and an inlet 35 is provided at the base of the chamber for introducing steam or other inert gas for elutriating or effecting separation of finely divided catalyst particles from the inert, heat transfer solids. The finely divided catalyst particles supported in the stream of elutriating gas pass into the upper part of the chamber 34 and thence via line 36 into the upper part of reactor vessel 10. Because of the decrease in gas velocity when this stream enters the reaction vessel most of the catalyst particles drop back into the dense bed 18 while the elutriating gas mixes with the reaction product vapor and stripping gas and stripped out vapors for passage through the cyclone separators for separation of entrained catalyst particles and thence to product recovery equipment.

The inert heat transfer solid particles admixed with a small amount of catalyst particles are discharged from the bottom of chamber 34 into conduit 37 which serves as a standpipe for building up a fluistatic pressure in the heat transfer particles sufficient to cause them to flow through a slide valve or control valve 38 into conduit 30 where they are picked up by a stream of regeneration air and conveyed into the regenerator 40.

The point of introduction of the inert heat transfer solids into the transfer line 30 is upstream from the point of introduction of the main stream of spent catalyst particles. In this way substantial amounts of inert heat transfer solids are intimately mixed with the spent catalyst particles as soon as they come into contact with the regeneration air. Since the rate of burning of hydrogen adsorbed upon the catalyst as well as of the carbonaceous deposits in contact with the particular catalyst components used in extremely high, the inert heat transfer solid particles serve to absorb much of the heat of regeneration and thereby prevent overheating of the catalyst as would invariably occur in the spent catalyst was passed alone with the regeneration air through the transfer line into the regenerator.

The mixture of catalyst, inert heat transfer solids and regeneration gas is discharged from transfer line 30 into inlet chamber 41 at the bottom of regenerator 40. A perforated distributor plate or grid 42 covers the top of the inlet chamber and serves to distribute the incoming mixture uniformly over the entire cross section of the regenerator. The velocity of the gases passing through regenerator 40 is so controlled that a dense, highly turbulent fluidized bed of catalyst and inert heat transfer solids 43 having a definite level 44 is formed in the regenerator. The superficial velocity of the regeneration gas through the regenerator may range from 0.3 to 1.5 feet per second depending upon the pressure. For example at regeneration pressures of about 200–300 lbs. per sq. inch the superficial velocity should be about 1.0 ft. per second or lower.

In the event that the reforming operation in reactor 10 does not form sufficient carbon to maintain heat balance in the system, torch oil or gas may be supplied to a nozzle 45 to heat the mixture of catalyst and heat transfer solids to the desired temperature.

The weight ratio of inert solids to catalyst circulated from the reactor 18 to the regenerator 43 may vary from about 1 to about 100 depending upon the relative amount of heat provided by the naphtha and recycle gas streams as compared to that supplied by the circulating inert solids. Temperature of regeneration may be between 1000 and 1200° F., and reactor temperatures may be in the range of 800 to 1000° F. Catalyst-to-oil ratios, which in this system are independent of heat balance considerations, may be varied from about 0.1 to 5 pounds of catalyst per pound of oil, with values of 0.3 to 1 being in the more desirable range. Temperature of the preheated recycle gas may be in the range of 800 to 1200° F., with temperatures below 1000° F. being preferable in order to obviate the use of alloy tubes in the furnace. Recycle gas rates of 1000 to 10,000 cu. ft./bbl. may be employed, but rates of 1000 to 3000 cu. ft./bbl. are generally preferable. The naphtha feed may be preheated to from 500 to 1000° F., with the optimum range being 600 to 900° F. It is possible with this system to limit naphtha preheat to 600° F., obtainable by heat exchange with product streams, and thus eliminate the necessity for a naphtha preheat furnace.

Combustion gases pass overhead from the dense fluidized bed 43 and pass through one or more cyclone separators 46 or the like arranged at the top of the regenerator vessel to remove the bulk of the entrained solid particles which are returned to the dense bed by the dip pipe 47 and are then discharged via line 48 to the atmosphere or to heat or energy recovery equipment. A well 49 extends above grid 42 into the lower portion of the dense bed 43. A mixture of inert heat transfer solids and catalyst passes from the dense bed 43 into the well 49 and thence through conduit 50 countercurrent to a stream of steam or other inert stripping gas which strips out combustion or regeneration gases that are entrained with the mixture leaving dense bed 43. The stripped mixture of solids pass into standpipe 52 wherein a sufficient fluistatic pressure is developed to overcome the pressure drop taken by the solids passing through the slide or control valve 53, transfer line 14 into reactor 10. The mixture of inert solids and catalyst discharged from standpipe 52 is picked up by a stream of hydrogen-containing recycle gas supplied through line 54. The length of the transfer line and the size of the inlet chamber 15 should be so designed as to assure adequate contact time between the catalyst and the hydrogen-containing gas to effect reduction thereof or reconversion to its more active form. Ordinarily contact times of about 1 to 5 seconds should suffice to recondition the catalyst.

Following are examples of applications of the system to the hydroforming of a 200 to 350° F. virgin naphtha having a clear octane number by the Research method of 45 to 50 to yield a finished gasoline of 95 to 100 Research clear octane number.

Operations are all on a catalyst consisting of about 9 per cent molybdenum oxide impregnated on activated alumina or alumina gel, and at a pressure of about 200 p. s. i. g.

| Column | A | B | C | D |
| --- | --- | --- | --- | --- |
| Reactor Temperature, ° F | 900 | 900 | 900 | 950 |
| Catalyst/oil weight ratio | 1 | 0.5 | 0.5 | 0.5 |
| Recycle Gas Rate, cu. ft./bbl | 3,000 | 1,500 | 1,500 | 1,500 |
| Regenerator Temperature, ° F | 1,150 | 1,150 | 1,150 | 1,100 |
| Naphtha feed temperature, ° F | 950 | 800 | 600 | 800 |
| Recycle Gas Temperature, ° F | 1,185 | 1,000 | 900 | 1,000 |
| Approx. inert solids/oil wt. ratio | 0 | 5 | 9 | 9 |

Column A in the above tabulation lists conditions imposed in the conventional system by heat balance considerations when no inert heat transfer solids are employed. Column B illustrates that, by circulating inert heat transfer solids such as sand or inactive silica gel at a rate of approximately 5 pounds of solids per pound of naphtha feed, the catalyst-to-oil ratio and the recycle gas rate may be lowered to values more desirable from product distribution considerations, and the naphtha feed and recycle gas temperatures may be appreciably lowered so that the possibility of furnace coking is eliminated and alloy tubes in the recycle gas furnace are not needed. As shown by column C, increasing the inert solids-to-oil weight ratio to about 9 permits further lowering of the recycle gas temperature, and permits lowering naphtha feed preheat temperature to a level which can be attained by heat exchange only and eliminates the necessity for a feed furnace. Column D illustrates the fact that a reactor temperature of 950° F. can easily be achieved even at reduced regenerator temperature by employing an inert solids-to-oil ratio of approximately 9. In those cases employing inert heat transfer solids such as sand or inactive gels, the catalyst preferably consists of particles in the range of 0–80 microns, and the inert solids are ground to provide a particle size range of about 100–200 microns. It is not essential that a complete separation of catalyst from inert solids be obtained in the elutriating section 34 because any catalyst entrained with the inert solids from this zone can be compensated for by reducing the rate at which catalyst is withdrawn from the reactor 18 through standpipe 27 and control valve 28.

The foregoing description contains a limited number of embodiments of the present invention. It will be understood that numerous variations are possible without departing from the scope of the following claims.

What is claimed is:

1. In the method of reforming hydrocarbon fractions boiling within the naphtha range in contact with a mixture of finely divided reforming catalysts and inert heat transfer solids in a dense fluidized bed the improvement which comprises withdrawing a stream of inert heat transfer solids and a stream of finely divided spent catalyst particles from the reaction zone, adding the inert heat transfer solids to a stream of regeneration gas, discharging the stream of spent catalyst particles into mixture of inert solids and regeneration gas, discharging the resultant mixture into a regeneration zone, withdrawing a mixture of inert solids and regenerated catalyst particles from the regeneration zone and recycling the same to the reaction zone.

2. In the method of reforming hydrocarbon fractions boiling within the naphtha range in contact with a mixture of finely divided reforming catalyst and inert heat transfer solids in a dense, fluidized bed in a reaction zone the improvement which comprises withdrawing a stream of finely divided spent catalyst particles from the upper part of the dense fluidized bed, withdrawing a mixture of inert heat transfer solids and finely divided catalyst particles from the bottom of the dense, fluidized bed, passing the latter mixture through an elutriation zone, separating a substantial part of the catalyst particles from said mixture and returning the separated catalyst particles to the reaction zone, withdrawing a stream of inert heat transfer solids from the elutriation zone, adding the inert heat transfer solids to a stream of regeneration gas, discharging the stream of spent catalyst particles into mixture of inert solids and regeneration gas, discharging the resultant mixture into a regeneration zone, withdrawing a mixture of inert solids and regenerated catalyst particles from the regeneration zone and recycling the same to the reaction zone.

3. In the method of reforming hydrocarbon fractions boiling within the naphtha range in contact with a mixture of finely divided reforming catalyst and inert heat transfer solids in a dense fluidized bed the improvement which comprises withdrawing a stream of inert heat transfer solids and a stream of finely divided spent catalyst particles from the reaction zone, adding the inert heat transfer solids to a stream of regeneration gas, discharging the stream of spent catalyst particles into mixture of inert solids and regeneration gas, discharging the resultant mixture into a regeneration zone, burning an extraneous fuel in the regeneration zone in order to heat the mixture of inert solids and catalyst, withdrawing a mixture of inert solids and regenerated catalyst particles from the regeneration zone and recycling the same to the reaction zone.

4. In the method of reforming hydrocarbon fractions boiling within the naphtha range in contact with a mixture of finely divided reforming catalyst and inert heat transfer solids in a dense, fluidized bed in a reaction zone the improvement which comprises withdrawing a stream of finely divided spent catalyst particles from the upper part of the dense fluidized bed, withdrawing a mixture of inert heat transfer solids and finely divided catalyst particles from the bottom of the dense fluidized bed, passing the latter mixture through an elutriation zone, separating a substantial part of the catalyst particles from said mixture and returning the separated catalyst particles to the reaction zone, withdrawing a stream of inert heat transfer solids from the elutriation zone, adding the inert heat transfer solids to a stream of regeneration gas, discharging the stream of spent catalyst particles into mixture of inert solids and regeneration gas, discharging the resultant mixture into a regeneration zone, burning an extraneous fuel in the regeneration zone in order to heat the mixture of inert solids and catalyst, withdrawing a mixture of inert solids and regenerated catalyst particles from the regeneration zone and recycling the same to the reaction zone.

References Cited in the file of this patent

UNITED STATES PATENTS

| | | |
|---|---|---|
| 2,325,516 | Holt et al. | July 27, 1943 |
| 2,393,636 | Johnson | Jan. 29, 1946 |
| 2,446,247 | Scheineman | Aug. 3, 1948 |
| 2,472,844 | Munday et al. | June 14, 1949 |